Oct. 20, 1964  J. F. PRINCE  3,153,354
ADJUSTABLE TOOL HEAD ATTACHMENT
Filed Dec. 26, 1962  2 Sheets-Sheet 1
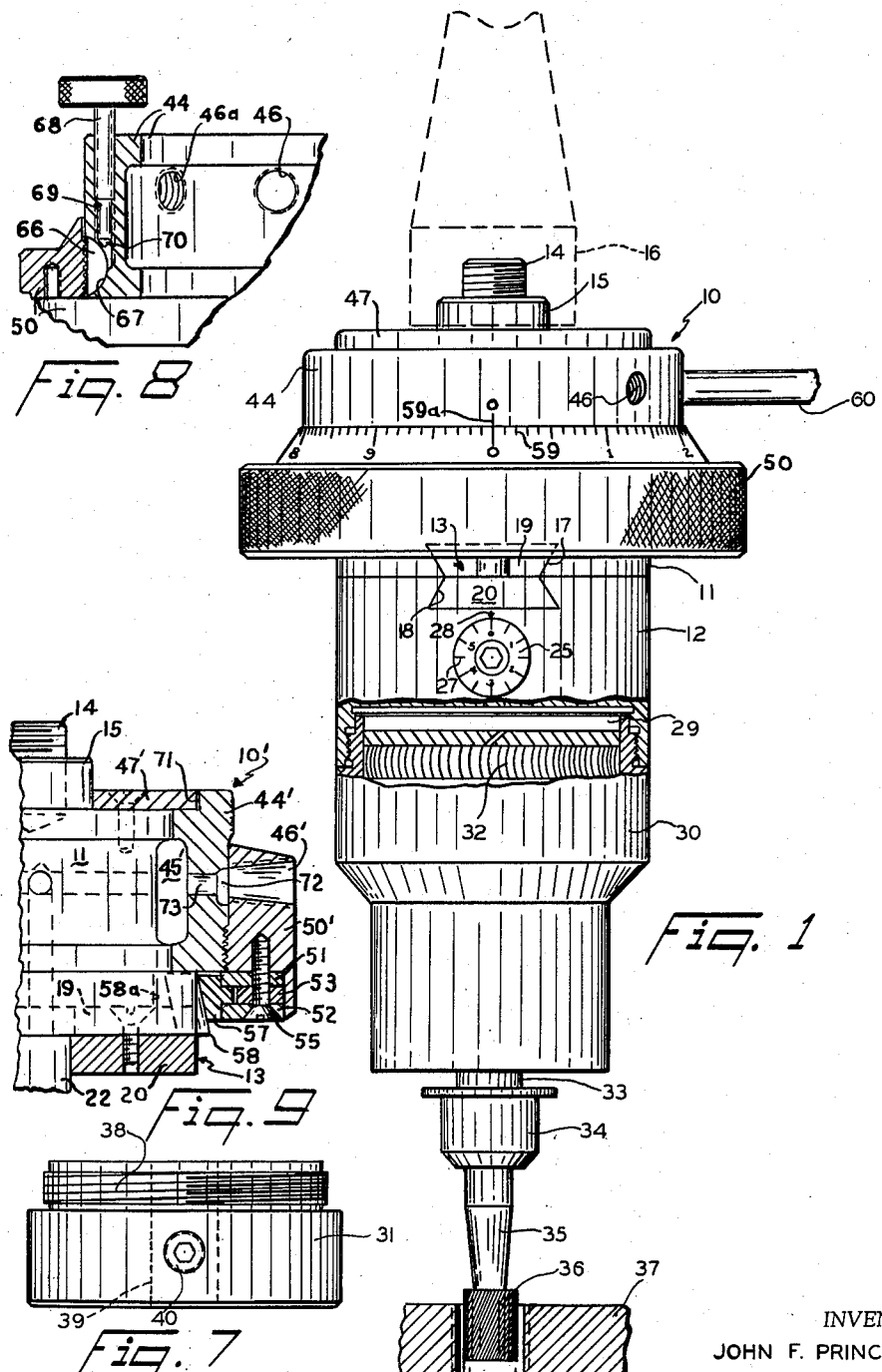
INVENTOR.
JOHN F. PRINCE
BY Oct. 20, 1964  J. F. PRINCE  3,153,354
ADJUSTABLE TOOL HEAD ATTACHMENT
Filed Dec. 26, 1962  2 Sheets-Sheet 2
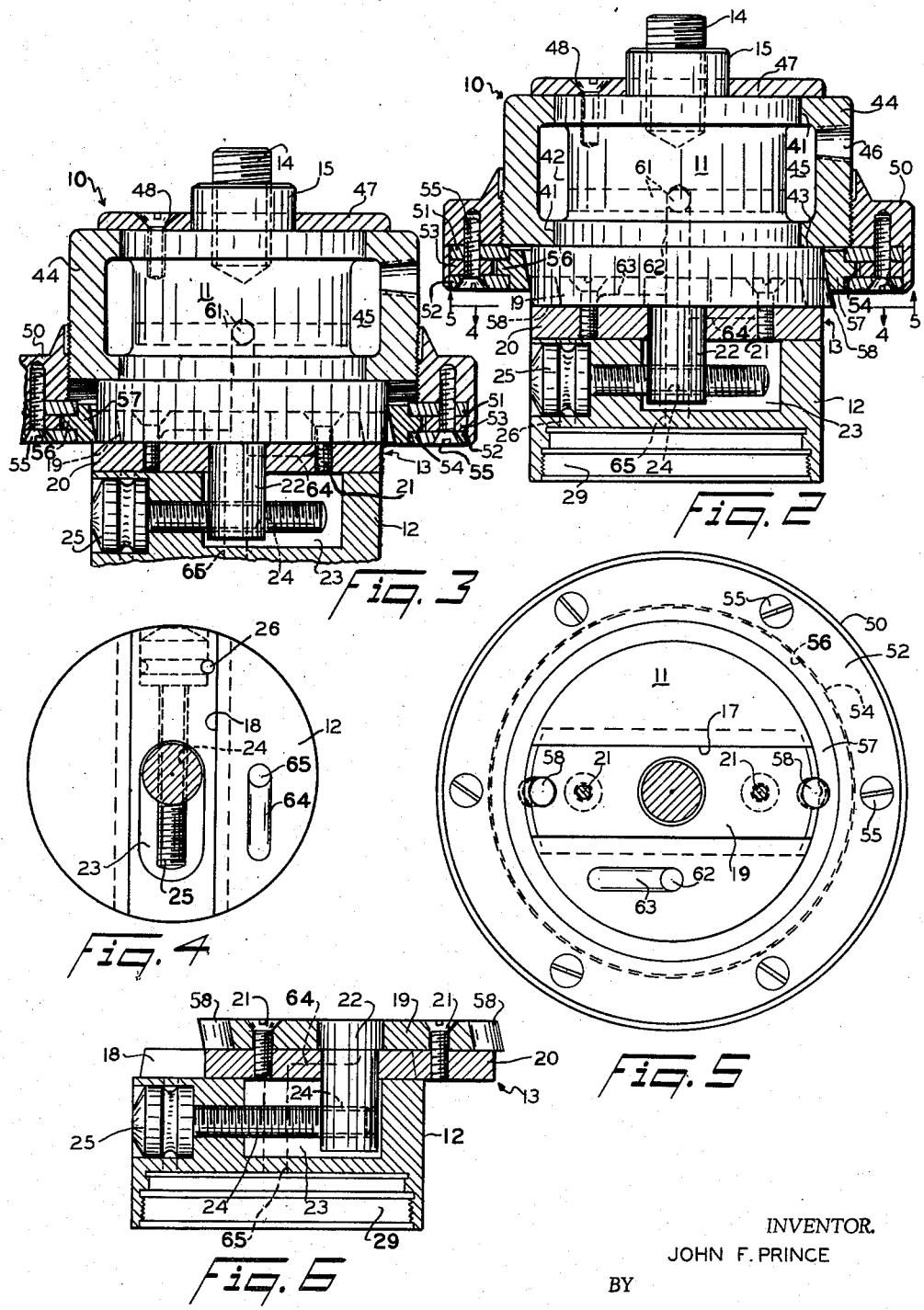
INVENTOR.
JOHN F. PRINCE
BY United States Patent Office 3,153,354
Patented Oct. 20, 1964

3,153,354
ADJUSTABLE TOOL HEAD ATTACHMENT
John F. Prince, 223 Willmore Place, Syracuse, N.Y., assignor of fifty percent to Joseph J. Prince, Jr., Syracuse, N.Y.
Filed Dec. 26, 1962, Ser. No. 247,122
10 Claims. (Cl. 77—58)

This invention relates to an attachment for boring machines and the like for controlling the radial ajustment of an orbiting tool with respect to the axis of rotation of the machine. More particularly, it relates to a head attachable to a rotating spindle and having a tool carrier transversely adjustable on the head for carrying the tool in an orbital path, and having non-rotating parts for adjusting the orbit of the tool while the head is rotating.

Attachments heretofore known for carrying a rotating grinding wheel or a boring tool in an orbital path have the disadvantage that the machine must be stopped before any adjustment can be made to the attachment for changing the path of the tool, or the means provided for controlling the path of the tool is not positive in action for precisely adjusting and maintaining the radius of the circular orbit of the tool.

The principal object of the invention, accordingly, is to provide means in such an attachment for precisely controlling the orbital path of a tool, which control means may be adjusted while the attachment is rotating.

Another important object is to provide a boring or grinding head adapted to be attached to the rotating spindle of a boring machine or the like, and in which the radial adjustment of the tool may be initially quickly made while the head is at rest and then more precisely and progressively adjusted while the head is rotating.

A further object is to provide a boring head in which a boring tool may be secured for travel in a circular path and in which the portion of the head carrying the tool is positively adjustable transversely in either direction with respect to the axis of rotation by a rotating part which is directly responsive to the adjustment of a non-rotating part, and the tool carrying portion is positively maintained in its adjusted position by the adjusting means.

A still further object is to provide a grinding head in which a motor driven grinding wheel may be secured for travel in an orbital path about the axis of rotation of the head and in which the portion of the head carrying the grinding wheel is positively adjustable transversely in either direction with respect to the axis of rotation by a rotating part which is directly responsive to the adjustment of a non-rotating part, and the wheel carrying portion is positively maintained in its adjusted position by the adjusting means.

Other objects and advantages will become apparent from the following description taken in conjunction with the accompanying drawings, in which:

FIGURE 1 is a side elevational view of an attachment according to the invention, carrying a motor driven grinding wheel;

FIGURE 2 is a longitudinal sectional view showing the body and tool carrier portions thereof in coaxial position;

FIGURE 3 is a view similar to FIGURE 2 showing the tool carrier portion adjusted transversely with respect to the body portion to the fullest extent by the fine adjustment means;

FIGURE 4 is a sectional view on the line 4—4 of FIGURE 2 with the dovetail slide removed;

FIGURE 5 is a sectional view on the line 5—5 of FIGURE 2;

FIGURE 6 is a view similar to FIGURE 2 of the tool carrier and slide portions of the attachment showing the carrier adjusted transversely with respect to the slide to the fullest extent by the coarse adjustment means;

FIGURE 7 is a side elevational view of a boring tool holder which may be secured to the attachment instead of the air motor of FIGURE 1;

FIGURE 8 is a fragmentary cross-sectional view of a portion of FIGURE 2 showing means for locking together the fine adjustment means; and FIGURE 9 is a fragmentary sectional view similar to a portion of FIGURE 2 showing a modified form of fine adjustment means.

Referring now to FIGURES 1 and 2, the attachment 10 comprises a body 11 and a tool carrier 12 adjustably secured together by a double dovetail slide 13, together with adjusting members hereinafter described.

The body 11 is provided at its upper end with a screw 14 and annular boss 15 for securing the body coaxially to the spindle 16 of the boring machine or other machine by means of which the body 11 is rotated. At its other end, body 11 has formed therein a transversely and diametrically extending dovetail guideway 17 best seen in FIGURE 1.

The carrier 12 extends axially downward from body 11 and has a transversely and diametrically extending dovetail guideway 18 in its upper end. The carrier is supported by body 11 by means of the double dovetail slide 13 having an upper slide portion 19 in guideway 17 and a lower slide portion 20 in guideway 18. Slide 13 is preferably made in two pieces 19 and 20 joined together by the screws 21, as best seen in FIGURE 6. The two parts of slide 13 are further secured together by a headed cylindrical nut 22 pressed into suitable holes in the slide or otherwise secured to the slide.

The nut 22 extends downward into a suitable slot 23 in carrier 12 below the guideway 18 and has a threaded hole 24 extending transversely therethrough. A coarse adjustment screw 25 extends radially through carrier 12 into the slot 23 and engages the threaded hole 24 in the nut for moving the carrier radially with respect to slide 13. The head of screw 25 is grooved and a pin 26, FIGURE 4, is engaged in the groove for holding the screw axially secured in carrier 12. The head of screw 25 is provided with a scale 27 cooperating with an index mark 28 on the carrier as seen in FIGURE 1.

The lower end of carrier 12 is provided with a recess 29, appropriately threaded and shouldered as shown for securing therein the threaded and shouldered upper end of a motor 30 (FIG. 1) or the upper end of a tool holder 31 (FIG. 7), as desired. Motor 30 is shown as an air motor and is provided with the usual rotor 32, shaft 33 and chuck 34 in which the quill 35 of a grinding wheel 36 may be secured for grinding a hole in the work 37 as shown in FIGURE 1.

The boring tool holder 31 has a threaded and shouldered boss 38 for engagement in the recess 29 of the carrier, and is provided with an axially extending bore 39 for a boring tool. The usual set screw 40 is also provided for locking the tool in the holder.

Referring again to FIGURE 2, body 11 is provided with two annular flanges 41 and an intermediate annular groove 42. Below the lower flange 41 a shoulder 43 is provided for supporting an upper ring member 44 which engages flanges 41 for independent rotation with respect to body 11. The upper ring 44 has an internal annular groove for forming, with groove 42, an annular air chamber 45 between body and ring. Ring 44 is also furnished with a tapped hole 46 for receiving an air supply tube for supplying air to the air motor 30 as hereinafter described.

A flat annular cap member 47 is also provided for holding ring member 44 in rotatable engagement with the body 11, the cap member being secured to the upper end of the body by a plurality of screws 4.

The lower portion of upper ring 44 is threaded exteriorly to support a lower ring member 50 which may be axially adjusted thereon. A lock is provided for preventing relative rotation of ring 50 with respect to ring 44. The lock is shown in FIGURE 8 and is hereinafter described. The bottom of lower ring 50 is recessed to receive bearing rings 51 and 52 and a spacer ring 53 which form an interior annular recess 54. Screws 55 secure the rings 51, 52 and 53 to the lower ring 50.

Positioned in the recess 54 is the annular flange 56 of an annular camming member 57 which is rotatable relative to the lower ring 50 but moves axially with it when the ring is adjusted with respect to the upper ring 44. The camming member 57 surrounds the lower portion of body 11 and at least part of the upper slide portion 19 of slide 13, and is axially adjustable with the lower ring 50 from the position shown in FIGURE 2 to the position shown in FIGURE 3.

Connecting the upper slide portion 19 with camming member 57 are camming pins 58 which are carried at either end of the slide 13. Slide portion 19 is slightly shorter than the inside diameter of camming member 57 so that the parts may be readily assembled and so that slide 19 may be adjusted transversely with respect to the camming member 57. Pins 58 are carried in bores made partially in the upper slide portion 19 and partially in the annular camming member 57. The bores containing pins 58 are made at an angle to the vertical so that the axes of the pins are in a common plane also containing the axis of rotation of body 11 but at a small angle, approximately 10 to 20 degrees according to the rate of movement desired, to the axis of rotation so that when the camming member 57 is axially adjusted the slide 13 is cammed thereby transversely and radially to the right or the left as viewed in FIGURE 2. The axes of the pins 58 are also parallel so that when camming member 57 is moved downward one pin is cammed in one direction and when member 57 is moved upward the other pin is cammed in the other direction.

Both pins are carried in their respective bores partly in the upper slide portion 19 and partly in camming member 57 so that the camming member rotates with body 11 and slide 13, and the camming member firmly and positively maintains the slide in whatever position it has been adjusted to by the axial adjustment of the lower ring 50.

Pins 58 may be ground flat at their ends coplanarly with the upper and lower surfaces of the upper slide portion 19 as shown in FIGURES 2 and 3 or, if preferred, may extend upwardly for a short distance beyond the guideway 17 into radially extending slots 58a in the body 11 as shown in FIGURE 9 for providing a longer area of surface contact between each pin 58 and the camming member 57 when the latter is in the position shown in FIGURES 2 and 9.

For regulating the axial adjustment of ring 50 on upper ring 44, a scale 59 is provided on ring 50 which cooperates with an appropriate index mark 59a on the ring 44 as shown in FIGURE 1.

It will be apparent that when the attachment 10 is in position secured to the spindle of a machine, means may be provided to prevent the rotation of the ring members 44 and 50. A tubular conduit may be secured in the hole 46 for preventing the rotation of the ring members 44 and 50 when body 11 is rotating and also for supplying air to the air motor 30 when it is used. Alternatively a holding rod 60 may be used, as shown in FIGURE 1, one end being secured in another tapped hole 46a (FIG. 8) in ring 44 similar to the hole 46 but radially spaced 45 degrees therefrom. The other end of the rod 60 is adapted to abut against a fixed, vertically extending, portion of the machine near the spindle 16.

For leading fluid from the annular inlet chamber 45 to motor 30 a plurality of radially extending passageways 61 (FIG. 2) are provided in body 11 in conventional manner leading to an axially extending passage 62 in the body, as shown in FIGURES 2 and 5. A transversely extending slot 63 is provided in the surface of the lower end of body 11. The upper surface of carrier 12 is provided with a similar but oppositely extending slot 64, as shown in FIGURE 4, and an axially extending passage 65 is provided leading from slot 64 to the tool receiving recess 29, see FIGURE 6. Passage 65 is normally coaxial with passage 62 when body 11 and carrier 12 are in the positions shown in FIGURE 2, and slots 63 and 64 are in continuous communication over the range of transverse adjustment of carrier 12 with respect to body 11.

Novel means for locking the adjustment ring 50 in a selected position on the upper ring 44 is shown in FIGURE 8. A semi-circular or woodruff key 66 is carried in an axially extending semi-circular slot 67 in ring 44 along the threaded connection between rings 44 and 50. An axially extending locking screw 68 is carried in a drilled and tapped hole 69 extending from the top of ring 44 into the slot 67. Screw 68 is provided with a tapered lower end 70 so that when the screw is advanced in the hole 69 the end 70 cams the key 66 radially outward in the ring 44 so as to lock against the ring 50. When screw 68 is backed off, the key 66 is released from its engagement with the ring 50.

In operation, the attachment 10, with motor 30 or tool holder 31 secured thereto, is secured in the spindle 16 of the machine and adjusted in the machine in proper relation to the work 37. Before the machine is started, carrier 12 is adjusted transversely with respect to body 11, by turning the coarse adjustment screw 25. An air supply tube or a holding rod 60 is secured in the hole 46 or 46a for holding rings 44 and 50 from rotating and the machine is turned on.

As the grinding wheel or boring tool removes metal from the work, the transverse adjustment of carrier 12 with respect to body 11 may be adjusted while body 11 is rotating by turning ring 50 with respect to ring 44. When this happens the axial position of the ring 50 on ring 44 is changed carrying the camming member 57 either up or down.

When the camming member 57 is carried downward it forces the camming pin 58 on the right in FIGURE 2 to the left. Similarly, when camming member 57 is carried upward by the adjustment of ring 50, it forces the camming pin 58 on the left in FIGURE 2 to the right. As the pins are moved transversely the slide 13 is carried with them and carrier 12 is, of course, carried with the slide, thereby adjusting the radius of the orbit in which the grinding wheel or boring tool travels.

It will be apparent to those skilled in the art that a tool holder 31 may also be provided having a bore 39 with a slight taper so as to be adapted for securing therein a drill chuck. When the drill chuck is provided with an appropriate drill, all operations, including indicating, center drilling, drilling, boring, and grinding may be performed on the work without removing the attachment 10 from the spindle 16.

In FIGURE 9 a modified form of attachment 10' is shown in which an air supply tube receiving hole 46' is provided in the lower ring 50' instead of in the upper ring. Ring 50' is slightly greater in height, but is otherwise the same as the ring 50 of attachment 10.

The upper ring 44' of the attachment 10' is also of slightly greater height being provided with a round recess 71 for the cap member 47'. The ring 44' is also provided with an annular recess 72 in continuous communication with air supply hole 46'. A plurality of radially extending passages 73 in ring 44' provide continuous communication between chamber 45' and recess 72 for providing fluid under pressure for the motor 30 when a grinding operation is required.

The operation of the attachment 10' is the same as hereinabove described for attachment 10 except that the lower ring 50' is held against rotation and fine adjustment of the slide 13 laterally with respect to the axis of rotation of body 11 is accomplished by turning the upper ring 44'.

It will now be apparent that there has been provided means for radially adjusting the transverse position of the tool with respect to the axis of rotation of the attachment during rotation of the attachment, which adjusting means is directly and positively responsive to the relative axial adjustment of the rings 44 and 50 without the use of springs or other biasing means. Moreover, the camming member 57 rotates with body 11 and slide 13 although its axial adjustment in the attachment is controlled by ring 50 or 50'. So long as the ring 50 or 50' is maintained in one position with respect to the ring 44 or 44', the camming member positively maintains the slide 13 in its adjusted position with respect to the axis of rotation of body 11 because the camming member is in continual engagement with each of the pins 58 at either end of the slide 19.

It will be apparent to those familiar with the art, the invention may be embodied in other specific forms without departing from the spirit or essential characteristics thereof. The embodiments disclosed are therefore to be considered in all respects as illustrative rather than restrictive, the scope of the invention being indicated by the appended claims.

What is claimed is:

1. A laterally adjustable grinding and boring attachment for boring machines or the like including a body adapted for coaxial attachment to a rotatable tool head, a tool carrier extending axially from said body, said body having a dovetail guideway extending transversely across its end, a dovetail slide in said guideway secured to and supporting said carrier, a first ring mounted on said body, a second ring carried by said first ring and axially adjustable thereon, said first ring being axially secured on and relatively rotatable with respect to said body, means for preventing the rotation of said rings with said body, and an annular member axially secured on said second ring and relatively rotatable therein, said annular member having a pair of parallel diametrically opposed and oppositely facing camming surfaces, said dovetail slide having a pair of parallel diametrically opposed and oppositely facing camming surfaces in constant engagement with said annular member camming surfaces for inward and outward radial adjustment of said slide with respect to said body, said surfaces being at the same small angle to the axis of rotation of the body, whereby the axial adjustment of the second ring with respect to the first ring positively controls the lateral adjustment of the tool carrier in both directions during rotation of the attachment.

2. A laterally adjustable grinding and boring attachment for a boring machines or the like including a body adapted for coaxial attachment to a rotatable tool head, a tool carrier extending axially from said body, said body and carrier each having a dovetail groove extending transversely across their adjacent ends, a slide having a dovetail portion in each of said grooves for adjustably supporting said carrier in contact with said body and radially adjustable thereto, said carrier having mounted therein coarse adjusting means connected to said slide for adjustment of the carrier radially with respect to the slide, a first ring axially secured on said body and relatively rotatable thereon, a second ring carried by said first ring and axially adjustable thereon, said rings being adapted to be held against rotation with said body, an annular member axially secured to said second ring for axial adjustment therewith and relatively rotatable therein, said annular member having a pair of parallel diametrically opposed and oppositely facing camming surfaces, and said slide having a pair of parallel diametrically disposed and oppositely facing camming surfaces in constant engagement with said annular member camming surfaces for fine adjustment of said slide radially with respect to said body, said surfaces being at the same small angle to the axis of rotation of the body, whereby the radial location of the carrier with respect to the axis of rotation of the body may be approximately adjusted by said coarse adjusting means when the attachment is at rest and said radial location may be more precisely and progressively adjusted and locked in position by the axial adjustment of the second ring while the attachment body is rotating.

3. In a device of the class described, the combination with a rotatable tool head of a boring and grinding attachment having a body secured to said head for rotation about the same axis of rotation as the head, a tool carrier extending axially from said body, said body having a dovetail guideway extending transversely across its end, a dovetail slide in said guideway axially and rotatably securing said carrier to said body, a first ring axially secured on said body and relatively rotatable thereon, a second ring coaxially threaded to said first ring for axial adjustment thereon, said rings being adapted to be held against rotation with said body, an annular groove in said second ring, and an annular camming member axially secured in said groove and relatively rotatable therein, said camming member having a pair of parallel radially inward facing camming surfaces at diametrically opposite sides thereof, said dovetail slide having at its ends a pair of parallel radially outward facing camming surfaces in constant engagement with said camming member surfaces, said surfaces all being at the same small angle to said axis of rotation, whereby the transverse adjustment of the carrier with respect to said axis is positively controlled in either radial direction by the axial adjustment of the second ring.

4. In a device of the class described, the combination with a rotatable tool head of a boring and grinding attachment having a body secured to said head for rotation about the same axis of rotation as the head, a tool carrier extending axially from said body, said body having a dovetail guideway extending transversely across its end, a dovetail slide transversly adjustable in said guideway for axially securing said carrier to said body, a first ring axially secured on said body and relatively rotatable thereon, a second ring coaxially threaded to said first ring for axial adjustment thereon, an annular groove in said second ring, an annular camming member axially secured in said groove for axial adjustment with said second ring and relatively rotatable therein, a camming pin carried by said slide at either end thereof, each of said pins being mounted in a bore made partially in said slide and partially in said camming member, the axes of the pins being parallel and inclined at a small angle to the axis of rotation of the body, whereby the radial adjustment of the carrier with respect to the axis of rotation of the body is directly responsive to axial movement of the second ring in either direction.

5. An orbital boring and grinding attachment for use with a machine tool having a rotating spindle, comprising: a body adapted for coaxial attachment to the spindle for rotation therewith, a tool carrier extending axially from said body, said body and carrier each having a dovetail guideway extending diametrically across their adjacent ends; a double dovetail slide engaged in said guideways for supporting said carrier immediately adjacent said body and transversely adjustable thereto; said carrier having mounted therein a coarse adjustment screw and said slide having secured thereto a cooperating adjustment nut operatively engaged with said screw; a ring member mounted on said body and relatively rotatable thereon; an outer annular member coaxially threaded on said ring member for axial adjustment thereon and having an annular groove therein; an inner annular member having an annular flange engaged in said groove for axial adjustment with said outer member and independent rotation relative thereto, said inner member being disposed around and adjustable axially of at least a portion of said slide; a camming pin carried at either end of said slide and supported thereon, the axes of said pins being parallel and inclined at a small angle to the axis of rotation of the body; each of said pins being engaged in a bore partially in said slide and partially in said inner member, whereby said inner member is rotatable with said body and carrier and is axially adjustable with said outer member for controlling the radial adjustment of said slide with respect to the axis of rotation of the body.

6. The attachment of claim 5 in combination with a boring tool holder having means for securing a boring tool therein, said holder being adapted to be secured to said carrier.

7. The attachment of claim 5 in combination with a fluid operated motor, said motor having means for rotatably carrying and driving a grinding wheel and being adapted to be secured to the carrier; and a fluid supply conduit connected to said ring member for supplying fluid thereto; said ring member, body and carrier having cooperating fluid supply passages therein for continuous communication during relative rotation between the ring member and the body and during the transverse adjustment of the carrier with respect to the body, for supplying fluid to the motor.

8. The attachment of claim 5 in combination with a fluid operated motor, said motor having means for rotatably carrying and driving a grinding wheel and being adapted to be secured to the carrier; and a fluid supply conduit connected to the outer annular member for supplying fluid thereto; said outer member, ring member, body and carrier all having cooperating fluid supply passages therein for continuous communication during axial adjustment of the outer member on the ring member, during rotation of the body with respect to the ring member, and during radial adjustment of the carrier with respect to the body, for supplying fluid to the motor.

9. In a device of the class described, the combination, with a machine tool having a rotating spindle, of an attachment having a body adapted to be coaxially secured to the spindle, a tool carrier extending axially from said body, said body having a dovetail guideway extending transversely across its end, a dovetail slide in said guideway adapted to support said carrier, a first ring mounted on said body and relatively rotatable thereon, a second ring coaxially threaded to said first ring for axial adjustment thereon, one of said rings being adapted to be held against rotation, means responsive to the axial adjustment of the second ring on the first ring for moving the carrier along the guideway to adjust the radial location of the carrier with respect to the axis of rotation of the body, said first ring having a semicircular slot extending axially of the rings and disposed along said second ring, a semicircular key in said slot, a locking screw threadedly engaged with the first ring and extending axially thereof into said slot, the end of said screw in said slot being adapted to engage the curved edge of said key for camming it into locking engagement with said second ring.

10. In a device of the class described and in combination with a rotatable tool head of a boring and grinding attachment having a body coaxially secured to said head, a tool carrier extending axially from said body, the body and carrier having adjoining flat face portions, said carrier having mounted therein coarse adjusting means for positioning the carrier radially with respect to the axis of rotation of said body, fine adjusting means carried on said body and rotatable with respect thereto for positioning the carrier radially with respect to the axis of rotation of said body, the improvement comprising the body and carrier each having a dovetail groove extending transversely across their adjoining face portions and a double dovetail slide in said grooves, the dovetail portion of said slide in said body groove having sides tapering inward toward said carrier and the dovetail portion of said slide in said carrier groove having sides tapering inward toward said body, said coarse adjusting means and said fine adjusting means both being operatively connected to said slide, whereby the carrier is held in transversely sliding contact with the body and whereby a tool mounted on said carrier may be radially positioned with respect to the axis of rotation of the body by operation of said coarse adjusting means when the attachment is at rest and the tool may be more precisely radially positioned with respect to said axis of rotation by operation of said fine adjusting means while the attachment is rotating.

References Cited in the file of this patent

UNITED STATES PATENTS

| 1,017,371 | Beck | Feb. 13, 1912 |
| 1,866,112 | Kindelmann et al. | July 5, 1932 |
| 2,151,251 | Weidner | Mar. 21, 1939 |
| 2,356,651 | Chandler | Aug. 22, 1944 |
| 2,648,939 | Zelik et al. | Aug. 18, 1953 |
| 2,784,538 | Clark | Mar. 12, 1957 |

FOREIGN PATENTS

| 599,503 | Great Britain | Mar. 15, 1948 |
| 1,038,110 | France | May 6, 1953 |